US007610318B2

(12) United States Patent
Bartfai et al.

(10) Patent No.: US 7,610,318 B2
(45) Date of Patent: Oct. 27, 2009

(54) AUTONOMIC INFRASTRUCTURE ENABLEMENT FOR POINT IN TIME COPY CONSISTENCY

(75) Inventors: Robert F. Bartfai, Tucson, AZ (US); Edward H. Lin, Tucson, AZ (US); Gail A. Spear, Tucson, AZ (US); Michael E. Factor, Haifa, IL (US); Sivan Tal, Yokneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 10/674,900

(22) Filed: Sep. 29, 2003

(65) Prior Publication Data

US 2005/0071372 A1    Mar. 31, 2005

(51) Int. Cl.
 *G06F 17/30* (2006.01)
(52) U.S. Cl. .................................. 707/204; 707/104.1
(58) Field of Classification Search .............. 707/204, 707/207, 104.1, 200; 711/162
See application file for complete search history.

(56) References Cited

U.S. PATENT DOCUMENTS

| 5,720,029 | A | 2/1998 | Kern et al. |
| 5,937,414 | A | 8/1999 | Souder et al. |
| 6,157,991 | A | 12/2000 | Arnon |
| 6,237,008 | B1 | 5/2001 | Beal et al. |
| 6,269,432 | B1 * | 7/2001 | Smith .......................... 711/162 |
| 6,301,643 | B1 | 10/2001 | Crockett et al. |
| 6,446,175 | B1 | 9/2002 | West et al. |
| 6,643,671 | B2 * | 11/2003 | Milillo et al. ............... 707/204 |
| 2003/0074523 | A1 | 4/2003 | Johnson |
| 2004/0220981 | A1 * | 11/2004 | Taylor ......................... 707/204 |

FOREIGN PATENT DOCUMENTS

| JP | 2001-209565 | 8/2001 |
| JP | 2001-282628 | 10/2001 |

OTHER PUBLICATIONS

Asselin et al. ("Implementing Concurrent Policy", IBM Document No. GG24-3990-00, Dec. 1993).*

(Continued)

*Primary Examiner*—Jean B. Fleurantin
*Assistant Examiner*—Dennis Myint
(74) *Attorney, Agent, or Firm*—Dan Shifrin

(57) ABSTRACT

A two-phase process FlashCopy operation is provided that can be used to aid in the formation of consistency groups across multiple storage control units. In the first phase, preparations to create a new consistency group are made "revertible" by write-inhibiting the source volumes through "Establish-FlashCopy-revertible" commands. If the preparation of any volume within the consistency group fails, a "Withdraw-FlashCopy-revert" command may be executed, thereby causing a retention of the prior FlashCopy point-in-time copy. In the second phase, executed if all preparations are successful, a "Withdraw-FlashCopy-commit" command may be executed to remove all write-inhibit indicators, complete the creation of the new FlashCopy point-in-time copy and secure the new consistency group. Write requests to the FlashCopy source volumes may then be received and processed without risking corruption of the new consistency group on the Flashcopy target volumes.

15 Claims, 3 Drawing Sheets

OTHER PUBLICATIONS

Keidar, Idit et. al., "Moshe: A group membership service for WANs", ACM Transactions on Computer Systems, vol. 20, Issue 3, p. 191-238 [online] Aug. 2002. Retrieved from the Internet: <URL: http://portal.acm.org/ft_gateway.cfm?id=566341&type=pdf &coll=GUIDE&dl=GUIDE&CFID=37907824 &CFTOKEN=44111162>.*

Liu, Xiangning, et. al., "Multiview access protocols for large-scale replication", ACM Transactions on Database Systems, vol. 23, Issue 2, p. 158-198, [online],Jun. 1998. Retrieved from the Internet:<URL: http://portal.acm.org/ft_gateway.cfm?id=277628&type=pdf &coll=GUIDE&dl=GUIDE&CFID=37907824 &CFTOKEN=44111162>.*

* cited by examiner

AUTONOMIC INFRASTRUCTURE ENABLEMENT FOR POINT IN TIME COPY CONSISTENCY

CROSS-REFERENCED APPLICATIONS

This application incorporates by reference commonly-assigned and co-pending U.S. patent Ser. No. 10/464,024, filed Jun. 6, 2003, and entitled METHOD, SYSTEM AND ARTICLE OF MANUFACTURE FOR REMOTE COPYING OF DATA. This application also incorporates by reference commonly-assigned and co-pending U.S. patent Ser. Nos. 10/674,872, entitled METHOD, SYSTEM, AND PROGRAM FOR RECOVERY FROM A FAILURE IN AN ASYNCHRONOUS DATA COPYING SYSTEM; 10/675,289, entitled APPARATUS AND METHOD TO COORDINATE MULTIPLE DATA STORAGE AND RETRIEVAL STORAGE SYSTEMS; 10/676,852, entitled METHOD, SYSTEM AND PROGRAM FOR FORMING A CONSISTENCY GROUP; 10/674,866, entitled METHOD, SYSTEM AND ARTICLE OF MANUFACTURE FOR RECOVERY FROM A FAILURE IN A CASCADING PPRC SYSTEM; 10/674,845, entitled METHOD, SYSTEM, AND PROGRAM FOR MIRRORING DATA AMONG STORAGE SITES; and 10/675,317 entitled METHOD, SYSTEM AND PROGRAM FOR ASYNCHRONOUS COPY, all filed on Sep. 29, 2003.

TECHNICAL FIELD

The present invention relates generally to data backup in a data storage system and, in particular, to a method, system and computer program product for protecting consistency groups during a virtual copy operation, such as an IBM developed FlashCopy®, in an asynchronous peer-to-peer remote copy system.

BACKGROUND ART

Information technology systems, including storage systems, may need protection from site disasters or outages, where outages may be planned or unplanned. Furthermore, information technology systems may require features for data migration, data backup, or data duplication. Implementations for disaster or outage recovery, data migration, data backup, and data duplication may include mirroring or copying of data in storage systems. Such mirroring or copying of data may involve interactions among hosts, storage systems and connecting networking components of the information technology system.

A storage server, such as the IBM® TotalStorage® Enterprise Storage Server® ("ESS"), may be a disk storage server that includes one or more processors coupled to storage devices, including high capacity scalable storage devices, Redundant Array of Inexpensive (or Independent) Disks ("RAID"), etc. The enterprise storage servers are connected to a network and include features for copying data in storage systems.

Peer-to-Peer Remote Copy ("PPRC") is an ESS function that allows the shadowing of application system data from a first site to a second site. The first site may be referred to as an application site, a local site, or a primary site. The second site may be referred to as a recovery site, a remote site or a secondary site. The logical volumes that hold the data in the ESS at the primary site are called primary volumes, and the corresponding volumes that hold the mirrored data at the secondary site are called secondary volumes. High speed links, such as IBM ESCON® links may connect the primary and secondary ESS systems.

In the synchronous type of operation for PPRC, i.e., synchronous PPRC, the updates done by a host application to the primary volumes at the primary site are synchronously shadowed onto the secondary volumes at the secondary site. As synchronous PPRC is a synchronous copying solution, write updates are ensured on both copies (primary and secondary) before the write is considered to be completed for the host application. In synchronous PPRC the host application does not get the "write complete" response until the update is synchronously done in both the primary and the secondary volumes. Therefore, from the perspective of the host application, the data at the secondary volumes at the secondary site is equivalent to the data at the primary volumes at the primary site.

Inherent to synchronous PPRC operations is an increase in the response time as compared to asynchronous copy operation. The overhead comes from the additional steps which are executed before the write operation is signaled as completed to the host application. Also, the PPRC activity between the primary site and the secondary site may be comprised of signals and data which travel through the links that connect the sites, and the overhead response time of the host application write operations will increase proportionally with the distance between the sites. Therefore, the distance affects a host application's response time. In certain implementations, there may be a maximum supported distance for synchronous PPRC operations referred to as the synchronous communication distance.

In the Extended Distance PPRC method of operation, PPRC mirrors the updates of the primary volume onto the secondary volumes in an asynchronous manner, while the host application is running. In asynchronous PPRC, the host application receives a write complete response before the update is copied from the primary volumes to the secondary volumes and a host application's write operations are free of the typical synchronous overheads. Therefore, asynchronous PPRC is suitable for secondary copy solutions at very long distances with minimal impact on host applications. However, asynchronous PPRC does not continuously maintain a consistent (point-in-time) copy of the primary data at the secondary site, therefore risking data loss in certain circumstances.

SUMMARY OF THE INVENTION

The present invention provides methods, apparatus and computer program product for protecting consistency groups during data storage backup operations, particularly during the FlashCopy operation to create a new consistency group. The method includes two phases. In the first phase, a write-inhibit flag or indicator is imposed on FlashCopy source volumes of a new consistency group as part of their preparation for the FlashCopy operation. If the preparation of any volumes of the new consistency group are unsuccessful, the FlashCopy is withdrawn and the prior consistency group is retained, thereby aborting the formation of the new point-in-time copy (consistency group) and preventing corruption of the prior consistency group. If all volumes in the consistency group are successfully prepared, then in the second phase the write-inhibit flags are released and the FlashCopy operation committed, thereby indicating that the new consistency group has been secured. PPRC write requests may then resume to the secondary PPRC volumes.

The apparatus includes FlashCopy source and target devices. Means are included to impose, in a first FlashCopy phase, FlashCopy source volumes of a new consistency group are prepared for the FlashCopy operation, including imposing a write-inhibit flag on the FlashCopy source volumes. Means are further included to determine if the preparation of any volumes are unsuccessful. If so, means are included to execute a withdraw the FlashCopy and the prior FlashCopy point-in-time copy is retained, thereby preventing the corruption of the prior consistency group. If all FlashCopy source volumes in the current consistency group are successfully prepared, means are included to, in a second phase, execute a commit command whereby the FlashCopy operation is committed and the FlashCopy source volumes of the new consistency group have their write-inhibit flags removed, thereby indicating that the new consistency group has been secured. PPRC write requests may then resume to the secondary PPRC volumes.

The computer program product includes computer-readable code comprising a two-phase set of instructions for performing a FlashCopy operation. In the first phase, a write-inhibit flag or indicator is imposed on FlashCopy source volumes of a new consistency group as part of their preparation for the FlashCopy operation. If the preparation of any volumes of the new consistency group are unsuccessful, the FlashCopy is withdrawn and the prior consistency group is retained, thereby aborting the formation of the new point-in-time copy (consistency group) and preventing corruption of the loss prior consistency group. If all volumes in the consistency group are successfully prepared, then in the second phase the write-inhibit flags are released and the FlashCopy operation committed, thereby indicating that the new consistency group has been secured. PPRC write requests may then resume to the secondary PPRC volumes.

BRIEF DESCRIPTION OF THE DRAWINGS

Referring now to the drawings in which like reference numbers represent corresponding elements throughout.

DETAILED DESCRIPTION OF THE PREFERRED EMBODIMENT

In the following description, reference is made to the accompanying drawings which form a part hereof and which illustrate several implementations. It is understood that other implementations may be utilized and structural and operational changes may be made without departing from the scope of the present limitations.

Figure 1:
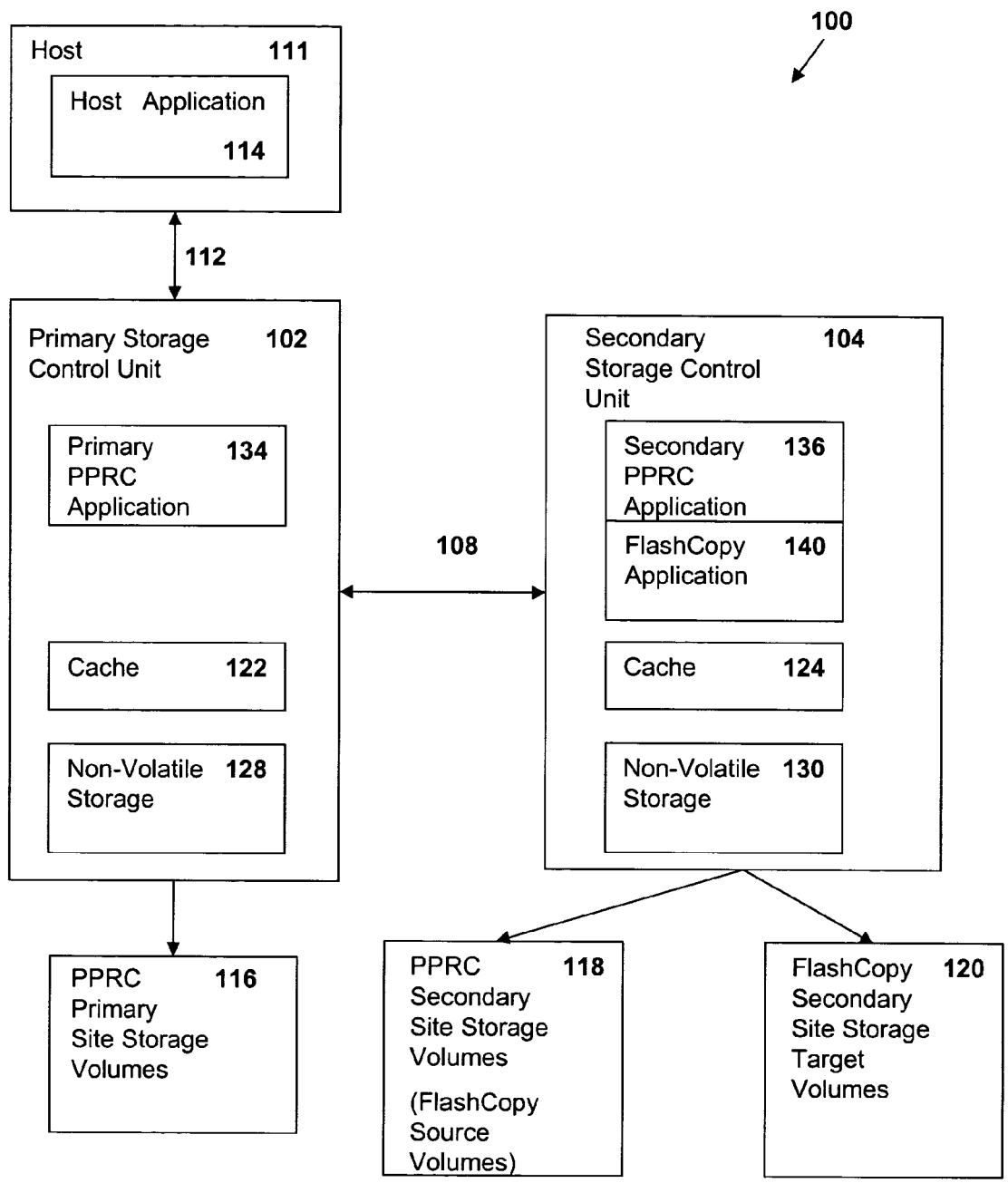
FIG. 1 is a block diagram of a network computing environment in which aspects of the invention may be implemented.

FIG. 1 illustrates a computing environment utilizing two storage control units, such as a primary storage control unit 102, and a secondary storage control unit 104 connected by a data interface channels 108, such as the ESCON channel or any other data interface mechanism known in the art (e.g., fibre channel, Storage Area Network (SAN) interconnections, etc.). The two storage control units 102 and 104 may be at two different sites and asynchronously interconnected. Additionally, the secondary storage control unit 104 may be in a secure environment separated from the primary storage control unit 102 and with separate power to reduce the possibility of an outage affecting both the primary storage control unit 102 and the secondary storage control unit 104.

Figure 2:
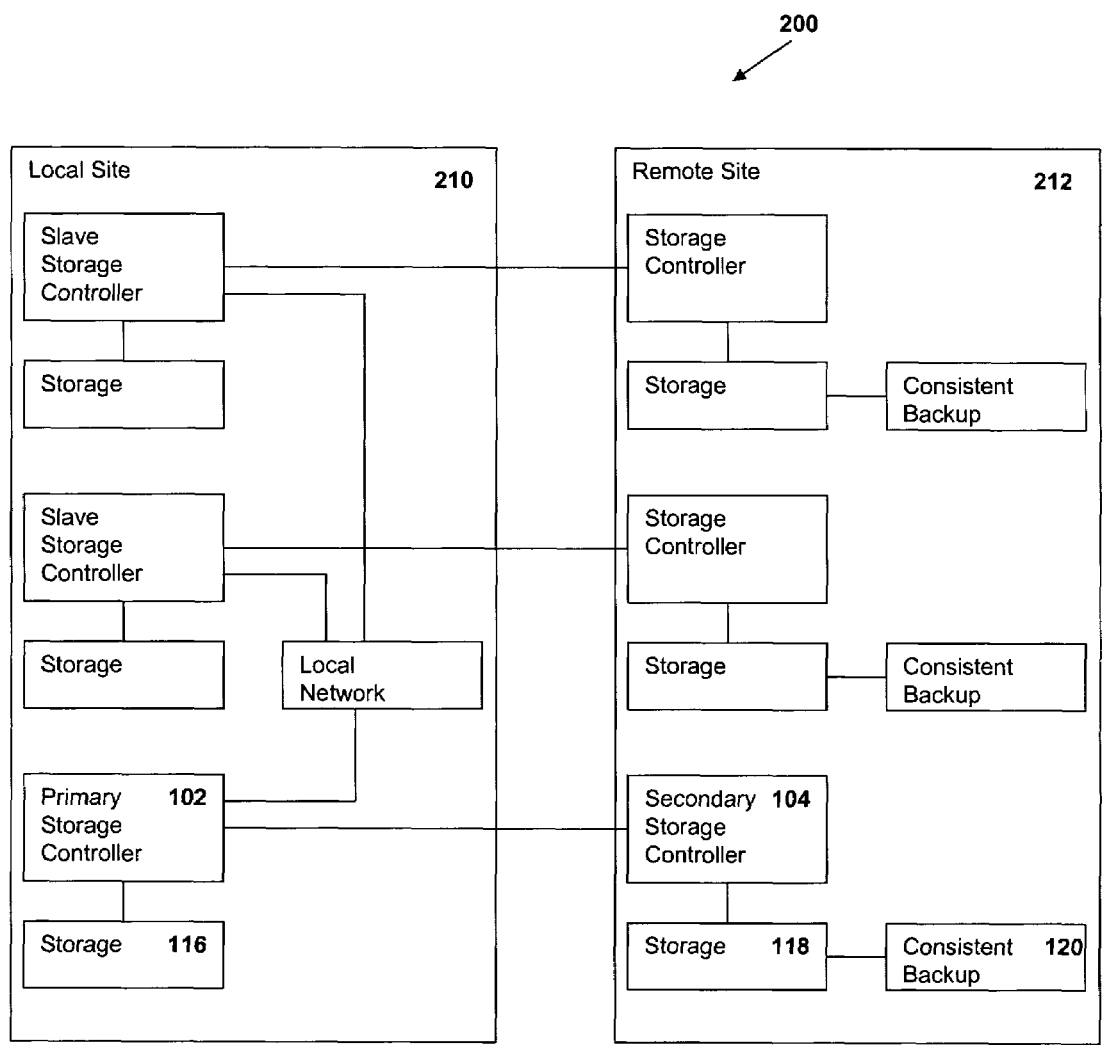
FIG. 2 is a block diagram of asynchronous data transfer and FlashCopy applications in accordance with certain described implementations of the invention.

FIG. 2 illustrates a network computing environment 200 in which aspects of the present invention may be implemented. In such an environment, the primary storage control unit 102, along with the primary storage volumes 116, may be among several (or many) storage controllers and storage volumes at a local site or sites 210. Similarly, the secondary storage control unit 104, along with the secondary storage volumes 118 and 120, may be among several (or many) storage controllers and storage volumes at a remote site or sites 212.

Referring back to FIG. 1, the primary storage control unit 102 is coupled to a host 111 via data interface channel 112. While only a single host 111 is shown coupled to the primary storage control unit 102, a plurality of hosts may be coupled to the primary storage control unit 102. The host 111 may be any computational device known in the art, such as a personal computer, a workstation, a server, a mainframe, a hand held computer, a telephony device, a network appliance, etc. The host 111 may include any operating system (not shown) known in the art, such as the IBM OS/390® operating system. The host 111 may include at least one host application 114 that sends Input/Output (I/O) requests (including write requests) to the primary storage control unit 102.

The storage control units 102 and 104 are coupled to storage volumes such as primary site storage volumes 116 and secondary site storage volumes 118 and 120, respectively. The storage volumes 116, 118, 120 may be configured as a Direct Access Storage Device (DASD), one or more RAID ranks, just a bunch of disks (JBOD), or any other data repository system known in the art. The storage control units 102 and 104 may each include a cache, such as caches 122 and 124 respectively. The caches 122 and 124 comprise volatile memory to store data blocks (for example, formatted as tracks). The storage control units 102 and 104 may each include a non-volatile storage (NVS), such as non-volatile storage 128 and 130 respectively. The non-volatile storage 128 and 130 elements may buffer certain modified data blocks in the caches 122 and 124 respectively.

The primary storage control unit 102 additionally includes an application, such as a primary PPRC application 134, for asynchronous copying of data stored in the cache 122, non-volatile storage 128 and primary site storage volumes 116 to another storage control unit, such as the secondary storage control unit 104. The primary PPRC application 134 includes functions which execute in the primary storage control unit 102. The primary storage control unit 102 receives I/O requests from the host application 114 to read and write from and to the primary site storage volumes 116.

The secondary storage control unit 104 additionally includes an application such as a secondary PPRC application 136. The secondary PPRC application 136 includes functions that execute in the secondary storage control unit 104. The secondary PPRC application 136 can interact with the primary storage control unit 102 to receive data asynchronously. A FlashCopy application 140 includes functions which ensure that until a data block in a FlashCopy relationship has been hardened to its location on a target disk, the data block resides on the source disk. The FlashCopy application 140 includes functions which execute Flashcopy-revertible, Withdraw-FlashCopy-revert and Withdraw-FlashCopy-commit commands of this invention.

Therefore, FIG. 1 illustrates a computing environment in which a host application 114 sends I/O requests to a primary storage control unit 102. The primary storage control unit 102 asynchronously copies data to the secondary storage control unit 104, and the secondary storage control unit 104 subsequently copies data from the PPRC Secondary storage volumes (FlashCopy Source volumes) 118 to the FlashCopy Target volumes 120 during FlashCopy operations. As a result of asynchronous copying, the effect of long distance on the host response time is eliminated.

The logic for processing a write request from the host application 114 will be described briefly. Control begins when the primary PPRC application 134 receives a write request from the host application 114. The primary PPRC application 134 writes data corresponding to the write request on the cache 122 and the non-volatile storage 128 on the primary storage control unit 102. Once the data is stored in the cache 122 and NVS 128, the primary PPRC application 134 signals to the host application 114 that the write request from the host application 114 has been completed at the primary storage control unit 102. The primary PPRC application 134 may then receive a next write request from the host application 114. Additional applications (not shown), such as caching applications and non-volatile storage applications, in the primary storage control unit 102 may manage the data in the cache 122 and the data in the non-volatile storage 128 and keep the data in the cache 122 and the non-volatile storage 128 consistent with the data in the primary site storage volumes 116.

Because the secondary storage control unit 104 receives data updates asynchronously, the volumes 118 on the secondary storage control unit 104 may not be consistent with the volumes 116 on the primary storage control unit 102. However, all of the volumes 118 from the secondary storage control unit 104 will be consistent at certain points in time. The consistent set of volumes (FlashCopy source volumes, also referred to as a "consistency group") at the secondary storage control unit 104 may then be preserved via a point-in-time FlashCopy to the FlashCopy target volumes 120. Preferably, writes to the secondary storage control unit 104 are inhibited or otherwise prevented between the primary and secondary control units 102 and 104, while the secondary storage control unit 104 catches up with the updates. Once the FlashCopy is completed to the FlashCopy volumes 120, recovery from a subsequent failure in the primary or secondary units 102 or 104 may be possible by restoring to the prior point-in-time consistency group stored on the FlashCopy target volumes 120.

As illustrated in FIG. 2, the consistency group may be distributed over many storage volumes in many storage controllers. Due to the distributed nature of the environment, FlashCopy commands to the source volumes (on the secondary unit 104) do not execute simultaneously. Consequently, once a FlashCopy operation begins, the FlashCopy target volumes 120 become inconsistent until the FlashCopy of all source volumes 118 is completed: some source/target volume pairs may have completed the FlashCopy, others may be in process of executing the FlashCopy command and still other may not have received the command yet. This period of time is the FlashCopy transition phase and, as long as no write request is received by the FlashCopy source (PPRC secondary) volumes 118, a reversion to the prior consistent set of volumes is still possible; that is, the prior consistency group will remain intact.

Figure 3:
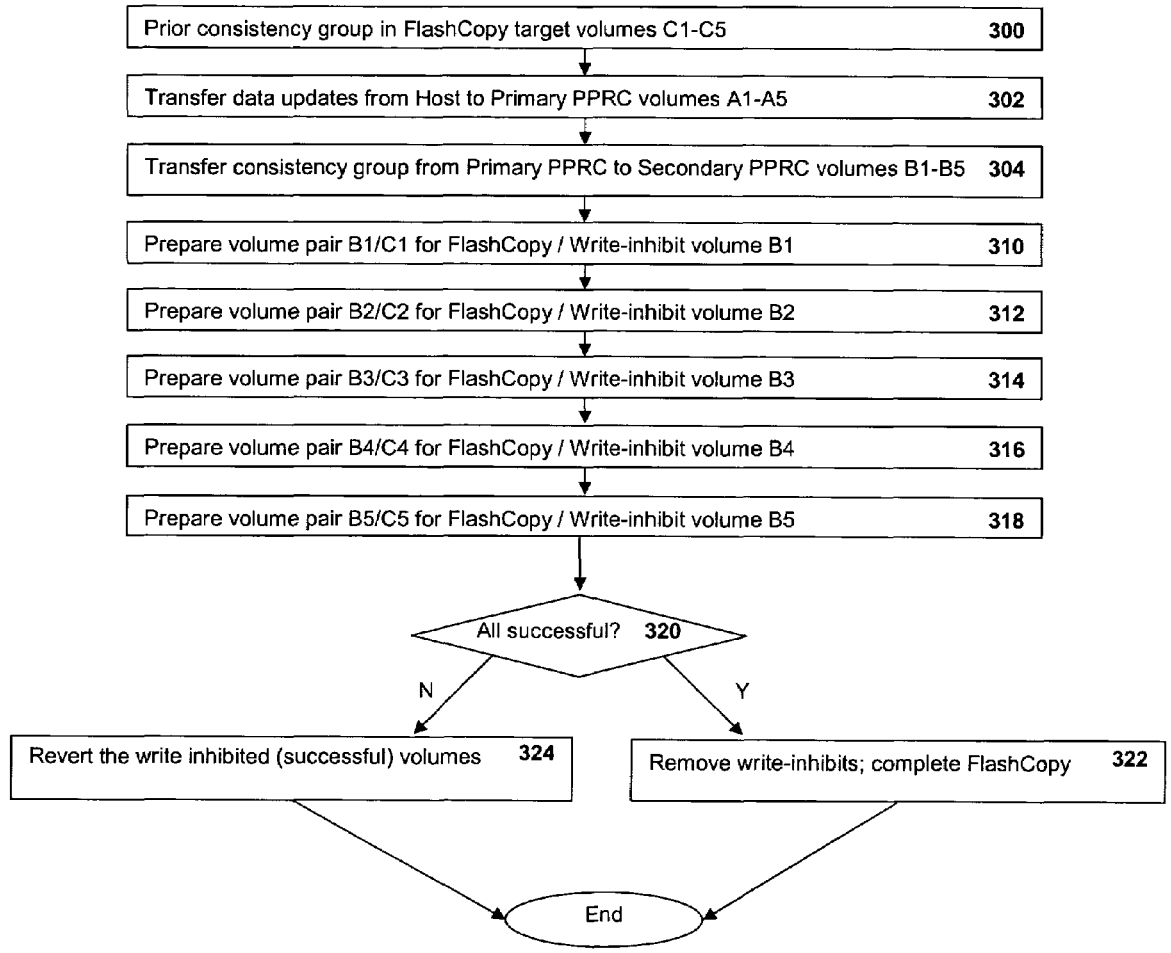
FIG. 3 is a flowchart illustrating logic in accordance with certain described implementations of the invention.

However, during the transition phase, the asynchronous PPRC mechanism of the primary unit 102 may time out, perform a warmstart or otherwise cause the I/O to the secondary unit 104 to resume. In such an event, the FlashCopy source volumes are no longer consistent and, because the FlashCopy target volumes are also inconsistent, reversion to the prior FlashCopy consistency group is not possible. This presents a window during which a disaster or failure at the primary unit 102 exposes data consistency to loss, particularly if the FlashCopy operation for any, but not all, of the volumes is unsuccessful. The present invention provides a method and means for reducing or eliminating such risk as will now be described with reference to FIG. 3.

Table I represents a configuration of volumes and their relationships of volumes in the PPRC primary 116, the PPRC secondary (FlashCopy source) 118 and the FlashCopy target 120. Table I will be described in conjunction with FIG. 3, a flowchart of an implementation of the present invention.

TABLE I

| PPRC Primary | PPRC Secondary/ FlashCopy Source | FlashCopy Target |
| --- | --- | --- |
| Volume A1 | Volume B1 | Volume C1 |
| Volume A2 | Volume B2 | Volume C2 |
| Volume A3 | Volume B3 | Volume C3 |
| Volume A4 | Volume B4 | Volume C4 |
| Volume A5 | Volume B5 | Volume C5 |

Volumes C1-C5 in the FlashCopy target 120 contain an older ("prior") consistency group (represented by step 300). Next, data updates are transferred from the host application 114 to primary PPRC volumes A1-A5 116, respectively, on the primary storage control unit 102 and represent a "new" consistency group (step 302). The new consistency group is transferred from the PPRC primary volumes 116 to the FlashCopy source volumes B1-B5 118, respectively, in the secondary storage control unit 104 (step 304). (It will be appreciated that any number of volumes may be transferred; five has been arbitrarily selected herein for descriptive purposes only and not by way of limitation.) The FlashCopy target volumes C1-C5 120 continue to contain the prior consistency group. It is now desired to FlashCopy from the B volumes to the C volumes. An Establish-FlashCopy-revertable command is generated to prepare the volume B1 in the secondary storage control unit 104 for a point-in-time copy operation. As the volume is prepared, the FlashCopy source volume B1 is write-inhibited (step 310). An attempt is made to prepare and write-inhibit the next source volume (B2) (step 312). The process continues (steps 314-318) until an attempt has been made to prepare and write-inhibit all source volumes B1-B5 to FlashCopy to the FlashCopy target volumes C1-C5.

Due to the write-inhibit indicators associated with successfully prepared source volumes, if any failures occur in any primary control units containing volumes corresponding to the source volumes and a primary control unit attempts to transmit a write request to the secondary storage control unit (primary PPRC) 104, the write-inhibit flag will cause the write request to fail and neither the prior consistency group C1-C5 nor the new consistency group B1-B5 will be corrupted.

If any FlashCopy preparations have been unsuccessful (step 320), such as volume B3 (due perhaps to a communication failure), then the successfully prepared volumes (those with write-inhibit indicators, volume pairs B1/C1, B2/C2, B4/C4 and B5/C5) are reverted with a Withdraw-FlashCopy-revert command (step 322); any volumes which failed in the preparation operation (volume B3/C3) remain unchanged (retaining the prior contents). As a result, the FlashCopy target volumes C1-C5 retain the prior consistency group in uncorrupted form. On the other hand, if the preparation operations of all source volumes were successful, a Withdraw-FlashCopy-commit command is generated to remove the write-inhibit indicators (step 324), signifying that formation of the current consistency group has been complete and secured in FlashCopy target volumes C1-C5. New writes may then be processed by the PPRC primary and secondary units. Moreover, any failures in the primary storage control unit 102 which cause data to attempt to flow from the PPRC primary A volumes 116 to the PPRC secondary B volumes 118 will fail and not corrupt the FlashCopy operation.

In a variation of the foregoing procedure, a determination may be made following each attempt to prepare a FlashCopy source volume as to whether the preparation was successful. If the preparation was unsuccessful, the procedure may jump to step 322 and the Withdraw-FlashCopy-revert command issued to abort the FlashCopy operation. Alternatively, the determination may be made following completion of the attempts to prepare all FlashCopy source volumes.

Thus, a FlashCopy operation is a two-phase process. In the first phase ("prepare"), each FlashCopy is made "revertable" by write-inhibiting the source volume (with the Establish-FlashCopy-revertable command). If any FlashCopy preparation fails, the withdraw-FlashCopy-revert command may be executed, thereby causing the prior consistency group to remain intact. In the second phase, executed if all FlashCopy preparations are successful, the Withdraw-FlashCopy-commit command may be executed to remove all write-inhibit indicators and allow write requests from the primary control unit to resume.

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media such as network transmission line, wireless transmission media, signals propagating through space, radio waves, infrared signals, etc. Of course, those skilled in the art will recognize that many modifications may be made to this configuration without departing from the scope of the implementations and that the article of manufacture may comprise any information bearing medium known in the art.

In certain implementations, data in the storage devices is arranged in volumes. In alternative implementations, other storage unit values may be assigned; such storage units may comprise tracks in a volume, blocks, logical subsystems, logical drives, or any other physical or logical storage unit designation known in the art.

The illustrated logic of the Figs. show certain events occurring in a certain order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for protecting consistency groups during a data storage backup operation, comprising:
    a) transferring data updates from a host device to a plurality of primary Peer-to-Peer Remote Copy (PPRC) volumes on a primary PPRC unit;
    b) upon the primary PPRC volumes forming a new consistency group, transferring the primary PPRC volumes to FlashCopy source volumes on a secondary PPRC unit;
    c) attempting to prepare a FlashCopy source volume for a FlashCopy operation to corresponding FlashCopy target volumes on which a prior consistency group is retained, the attempt including imposing a write-inhibit indicator on the FlashCopy source volume and generating an Establish-FlashCopy-revertable command;
    d) deciding whether the attempt to prepare the FlashCopy source volume is successful;
    e) reverting the FlashCopy operation if the preparation of the FlashCopy source volume is unsuccessful, whereby the prior consistency group is maintained in the FlashCopy target volumes;
    f) repeating steps c) through e) for each other FlashCopy source volume; and
    g) committing a FlashCopy operation of the consistency group from the FlashCopy source volumes to the corresponding FlashCopy target volumes if the preparation of all FlashCopy source volumes is successful, whereby the prior consistency group retained in the FlashCopy target volumes is replaced by the new consistency group.

2. The method of claim 1, wherein imposing the write-inhibit indicator prevents the reception of data updates by the FlashCopy source device transmitted from the PPRC source device during a FlashCopy operation.

3. The method of claim 1, further comprising releasing the write-inhibit indicators if the preparation of all FlashCopy source volumes is successful.

4. The method of claim 1 wherein the step of committing the FlashCopy operation comprises generating a Withdraw-FlashCopy-commit command.

5. The method of claim 4, wherein the step of reverting the FlashCopy operation comprises generating a Withdraw-FlashCopy-revert command.

6. A data storage system, comprising
    a primary storage controller coupled to receive data updates from at least one host device;
    a first storage unit coupled to the primary storage controller for storing primary Peer-to-Peer Remote Copy (PPRC) volumes;
    a secondary storage controller coupled to the primary storage controller;
    a second storage unit coupled to the secondary storage controller for storing FlashCopy source volumes;
    a third storage unit coupled to the secondary storage controller for retaining FlashCopy target volumes; and
    an application executing on the primary storage controller, the application comprising instructions for:
        a) transferring data updates from the at least one host device to the primary PPRC volumes;
        b) upon the primary PPRC volumes forming a new consistency group, transferring the primary PPRC volumes to the FlashCopy source volumes;

c) attempting to prepare a FlashCopy source volume for a FlashCopy operation to corresponding FlashCopy target volumes on which a prior consistency group is retained, the attempt including imposing a write-inhibit indicator on the FlashCopy source volume and generating an Establish-FlashCopy-revertable command;

d) deciding whether the attempt to prepare the FlashCopy source volume is successful;

e) reverting the FlashCopy operation if the preparation of the FlashCopy source volume is unsuccessful, whereby the prior consistency group is maintained in the FlashCopy target volumes;

f) repeating instructions c) through e) for each other FlashCopy source volume; and g) committing a FlashCopy operation of the new consistency group from the FlashCopy source volumes to the corresponding FlashCopy target volumes if the preparation of all FlashCopy source volumes is successful, whereby the prior consistency group retained in the FlashCopy target volumes is replaced by the new consistency group.

7. The data storage system of claim 6, further comprising means, responsive to the write-inhibit indicators, for preventing the reception of data updates by the secondary storage controller transmitted by the primary storage controller during a FlashCopy operation.

8. The data storage system of claim 7, further including means for releasing the write-inhibit indicators if the preparation of all FlashCopy source volumes is successful.

9. The data storage system of claim 7, wherein committing the FlashCopy operation comprises generating a Withdraw-FlashCopy-commit command.

10. The data storage system of claim 9, wherein reverting the FlashCopy operation comprises generating a Withdraw-FlashCopy-revert command.

11. A computer program product of a computer readable storage medium usable with a programmable computer, the computer program product having computer-readable code embodied therein for protecting consistency groups during a data storage backup operation, the computer-readable code comprising instructions for:

a) transferring data updates from a host device to primary Peer-to-Peer Remote Copy (PPRC) volumes on a primary PPRC unit;

b) upon the primary PPRC volumes forming a new consistency group, transferring the primary PPRC volumes to FlashCopy source volumes on a secondary PPRC unit;

c) attempting to prepare a FlashCopy source volume for a FlashCopy operation to corresponding FlashCopy target volumes on which a prior consistency group is retained, the attempt including imposing a write-inhibit indicator on the FlashCopy source volume and generating an Establish-FlashCopy-revertable command;

d) deciding whether the attempt to prepare the FlashCopy source volume is successful;

e) reverting the FlashCopy operation if the preparation of the FlashCopy source volume is unsuccessful, whereby the prior consistency group is maintained in the FlashCopy target volumes;

f) repeating instructions c) through e) for each other FlashCopy source volume; and g) committing a FlashCopy operation of the new consistency group from the FlashCopy source volumes to the corresponding FlashCopy target volumes if the preparation of all FlashCopy source volumes is successful, whereby the prior consistency group retained in the FlashCopy target volumes is replaced by the new consistency group.

12. The computer program product of claim 11, wherein imposing the write-inhibit indicator prevents the reception of data updates by the FlashCopy source device transmitted from the PPRC source device during a FlashCopy operation.

13. The computer program product of claim 11, the instructions further comprising releasing the write-inhibit indicators if the preparation of all FlashCopy source volumes is successful.

14. The computer program product of claim 11 wherein the instructions for committing the FlashCopy operation comprises instructions for generating a Withdraw-FlashCopy-commit command.

15. The computer program product of claim 14, wherein the instructions for reverting the FlashCopy operation comprises instructions for generating a Withdraw-FlashCopy-revert command.

* * * * *

UNITED STATES PATENT AND TRADEMARK OFFICE
CERTIFICATE OF CORRECTION

PATENT NO.       : 7,610,318 B2                                   Page 1 of 1
APPLICATION NO. : 10/674900
DATED            : October 27, 2009
INVENTOR(S)      : Bartfai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 780 days.

Signed and Sealed this

Twelfth Day of October, 2010

David J. Kappos
*Director of the United States Patent and Trademark Office*